No. 719,844. PATENTED FEB. 3, 1903.
W. A. McKEE.
ACID CHAMBER FOR SULFITE WORKS.
APPLICATION FILED OCT. 9, 1902.
NO MODEL. 2 SHEETS—SHEET 1.

WITNESSES: INVENTOR
William A. McKee
BY
ATTORNEYS.

UNITED STATES PATENT OFFICE.

WILLIAM ANDREW McKEE, OF HINCKLEY, NEW YORK.

ACID-CHAMBER FOR SULFITE-WORKS.

SPECIFICATION forming part of Letters Patent No. 719,844, dated February 3, 1903.

Application filed October 9, 1902. Serial No. 126,470. (No model.)

*To all whom it may concern:*

Be it known that I, WILLIAM ANDREW MC-KEE, a citizen of the United States, and a resident of Hinckley, in the county of Oneida and State of New York, have invented a new and Improved Acid-Chamber for Sulfite-Works, of which the following is a full, clear, and exact description.

My invention relates to an acid-chamber used in making bisulfite-of-lime liquors which are employed in the so-called "sulfite process of making pulp."

It will be noted that incidental to the sulfite process it is necessary to cause chemical action to take place between sulfur dioxid ($SO_2$) and ordinary lime-water. In doing this it is necessary to cause a thorough admixture of the lime-water and the gas, so that no part of the water or gas will fail to come into contact with material having an affinity therefor.

I will describe an acid-chamber for sulfite-works embodying my invention and then point out the novel features in the appended claims.

Reference is to be had to the accompanying drawings, forming a part of this specification, in which similar characters of reference indicate corresponding parts in both figures.

Figure 1:
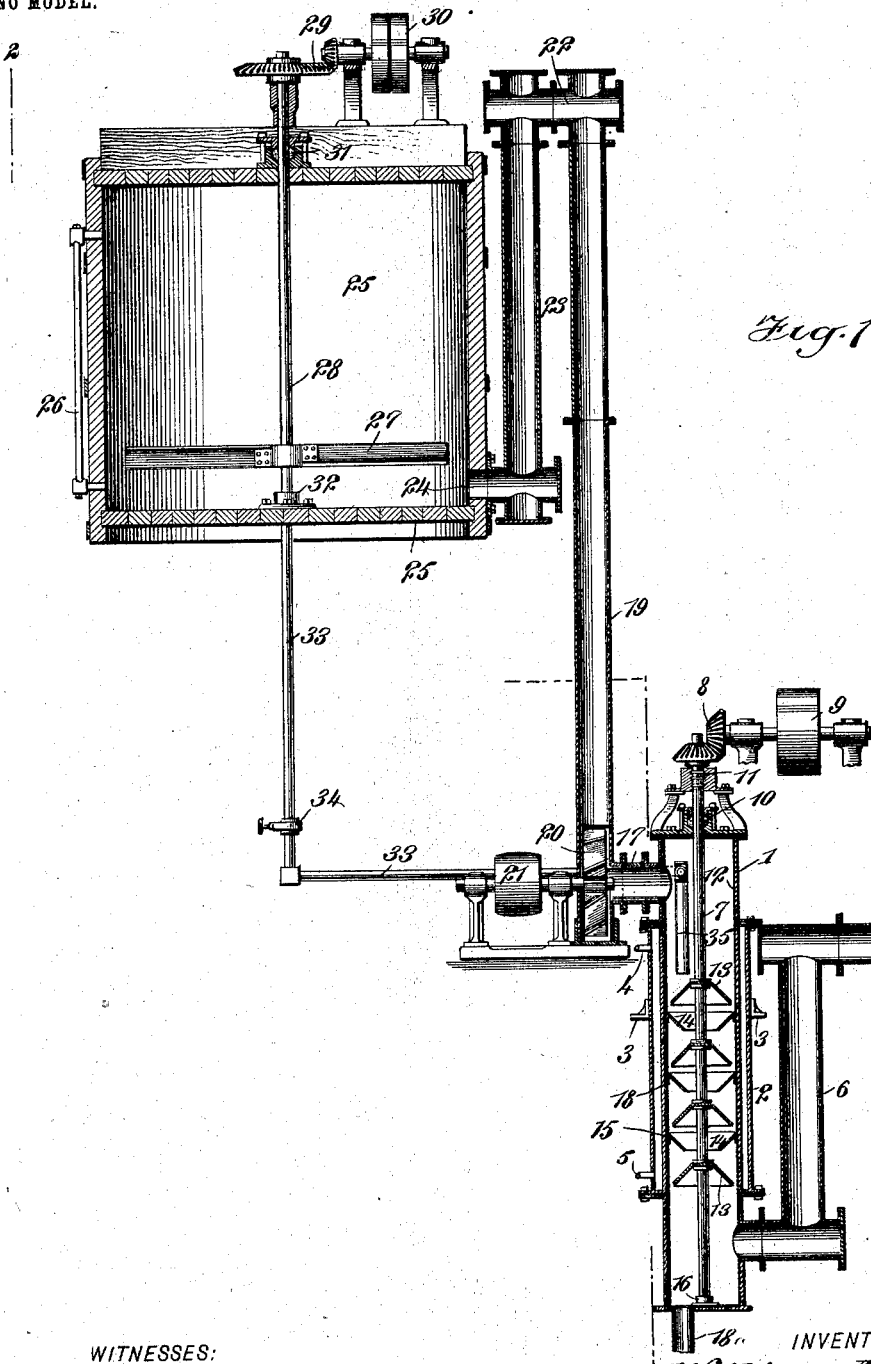
Figure 2:
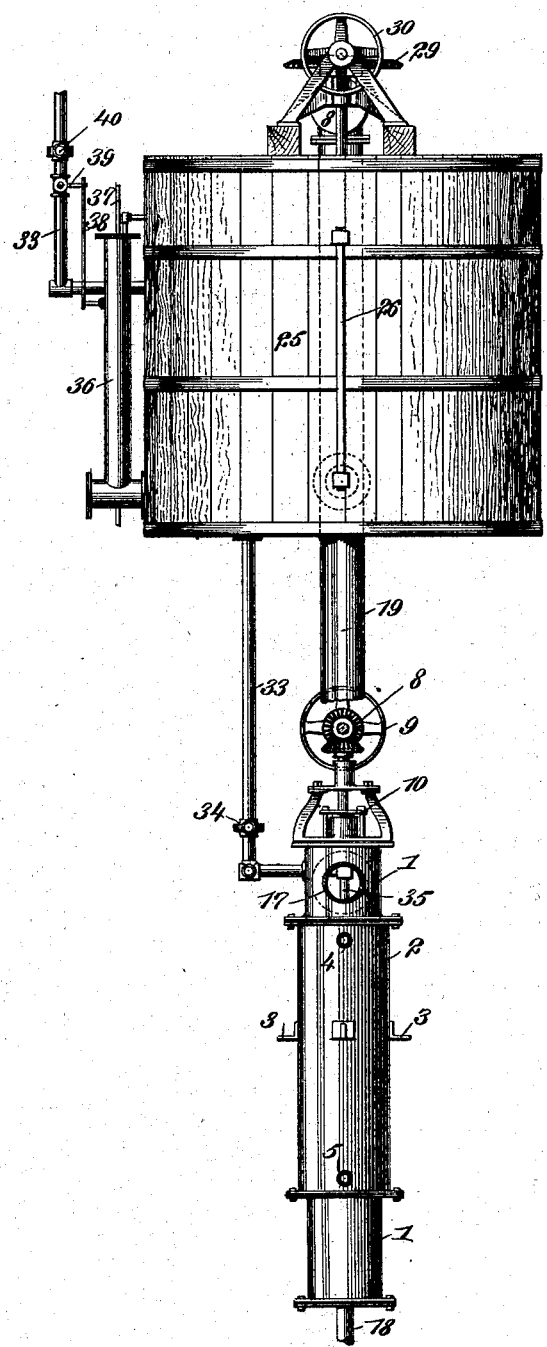

Figure 1 is a central section of my apparatus; and Fig. 2 is a side elevation partly broken away, and viewed as from the right of Fig. 1.

A cylinder 1 is surrounded by a water-jacket 2 of cylindrical form and concentric therewith. The jacket 2 is provided with lugs 3, upon which it is supported. An inlet-pipe 4 and an outlet-pipe 5 are provided for the purpose of causing the water to flow through the water-jacket, thereby keeping the cylinder 1 as cool as possible. A large pipe 6 is connected directly with the cylinder 1.

Mounted concentrically within the cylinder 1 is a revoluble shaft 7, driven by gearing 8, which is in turn actuated by a pulley 9. This shaft 7 passes through a stuffing-box 10 and a bearing 11. The cylinder 1 is lined internally with a thin jacket 12, of non-corrosive material, such as lead. Mounted rigidly upon the shaft 7 are a number of conical deflectors 13. Mounted between consecutive pairs of these deflectors are conical hoppers 14, encircling the shaft 7. For convenience in mounting these hoppers 14 may be made in halves, if desired.

Each hopper 14 is provided with an annular flange 15, whereby it is secured upon the internal wall of the cylindrical jacket 2. A stepped bearing 16 is mounted centrally within the cylinder 1 and supports the shaft 7. A tubular passage 17 is connected with the upper end of the cylinder 1 and a pipe 18 is connected with the bottom of the cylinder.

A tubular pipe 19 is connected with a fan 20, which is driven by means of a pulley 21, and is free to draw gases through the tubular member 17, thereby causing gases to flow upward through the cylinder 1, pursuing a sinuous route among the several hoppers and deflecting members above described. The tubular passage 19 is connected with a head 22, and the latter is in turn connected with a tubular passage 23, as indicated in Fig. 1, thus producing a bend elevated considerably above the tank 25 and connected thereto by the passage 24.

The tank 25, used for containing the lime-water, is provided with a gage 26. Disposed within the tank 25 are movable paddles 27, mounted upon a shaft 28, which is driven by gears 29 and pulleys 30. The revoluble shaft 28 is engaged by a stuffing-box 31 and is journaled in a bearing 32. A pipe 33 leads downward from the tank 25 and is provided with a hand-valve 34. This pipe 33 terminates in a nozzle 35, disposed within the cylinder 1.

Mounted upon the tank 25 is a float-chamber 36, provided with a float 37, which rises or falls according to the amount of liquid within the tank 25. As this float forms no part of my present invention, it is not herein more fully described.

A pitman 38 is connected with the float and with a valve 39 within the pipe 33, whereby the flow of liquid to the tank 25 is governed automatically. A hand-valve 40 may be used independently for the purpose of controlling the volume of liquid in the tank.

The operation of my device is as follows: The sulfur-dioxid gas is drawn by the fan 20 through the cylinder 1 and the tubular passage 6, which communicates with a supply of the gas—say, for instance, a cooling-chamber where such gas is cooled on its passage from the oxidizing-chamber. The gas passes upward from the lower end of the tubular passage 6 and pursues a sinuous course between the deflectors 13 upon the shaft 7 and the hoppers 14 upon the cylindrical vessel. Meanwhile lime-water is admitted, by means of the valve 34, through the nozzle 35 and discharged upon the upper deflecting member 13. The shaft 7 now being in motion and carrying with it the several deflecting members 13, the liquid is hurled violently by centrifugal force and made to strike the inner concaved wall of the lining 12. The liquid then runs down into one of the hoppers 14 and flows upon the next successive deflector, only to be again hurled against the cylindrical vessel. By this means the lime-water and the gas are brought into minute physical contact, and thus caused to combine, forming the sulfite liquors desired.

It will be observed that the water passes downward by its own weight, whereas the gases pass upward by means of suction exerted by the fan 20. Any sulfur dioxid which may have failed to combine with the lime-water passes upward through the tubular passage 19, downward through the passages 23 and 24, and thence upward through the tank 25, containing the lime-water, being caused to combine with the same.

While I show a fan as my preferred means for drawing the gases through the cylinder 1 and forcing them through the tank 25, I do not limit myself to this particular mechanism. Any other form of vacuum apparatus may be used for the purpose and its location need not be intermediate of the acid-chamber and the tank. With the gas-tight tank shown a vacuum apparatus or any analogous device may clearly be located at other points.

Having thus described my invention, I claim as new and desire to secure by Letters Patent—

1. An acid-chamber for sulfite-works, comprising a closed cylindrical vessel provided with a series of conical hoppers, and a revoluble shaft mounted within said vessel and provided with conical deflectors, means for creating a partial vacuum for the purpose of drawing acid gases through the said vessel, means for passing an alkaline liquid through said vessel in a direction opposite to that of the travel of said gases, and means for removing the heat generated chemically within said vessel.

2. An acid-chamber for sulfite-works, comprising a vertically-disposed cylindrical vessel provided with a series of conical hoppers, a cylindrical water-jacket incasing said vessel, a revoluble shaft mounted within said vessel, conical deflectors mounted upon said shaft, a pipe connected with the bottom of said vessel for supplying an acid gas thereinto, a pipe for admitting an alkaline liquid to the top of said vessel, means for rotating said shaft, a tank disposed adjacent to said vessel for holding a weak alkaline solution, and pneumatic mechanism for drawing said acid gas through said vessel and forcing the same through said tank.

In testimony whereof I have signed my name to this specification in the presence of two subscribing witnesses.

WILLIAM ANDREW McKEE.

Witnesses:
   E. H. WILLIAMS,
   GEO. M. McKEE.